United States Patent [19]
Watanabe

[11] Patent Number: 5,299,065
[45] Date of Patent: Mar. 29, 1994

[54] OBJECTIVE WITH LARGE APERTURE RATIO

[75] Inventor: Fumio Watanabe, Ohmiya, Japan

[73] Assignee: Fuji Photo Optical Co., Ltd., Saitama, Japan

[21] Appl. No.: 20,770

[22] Filed: Feb. 22, 1993

[30] Foreign Application Priority Data

Mar. 5, 1992 [JP] Japan .................................. 4-048297

[51] Int. Cl.[5] ............................................. G02B 9/62
[52] U.S. Cl. ..................................... 359/759; 359/756
[58] Field of Search ........................ 359/759, 754, 756

[56] References Cited

U.S. PATENT DOCUMENTS 3,454,326  7/1969  Schlegel ............................. 359/759
4,076,390  2/1978  Fleischman ......................... 359/767

Primary Examiner—Bruce Y. Arnold
Assistant Examiner—Evelyn A. Lester
Attorney, Agent, or Firm—Brumbaugh, Graves, Donohue & Raymond

[57] ABSTRACT

An objective lens comprising, respectively from the object: a first element of a positive lens, at the object end thereof, having a convex surface; a second element of a positive meniscus lens, at the object end thereof, having a convex surface; a third element of a negative lens, at the image end thereof, having a concave surface; a fourth element of a single lens or a cemented lens, at the object end thereof, having a convex surface, wherein the cemented lens includes two or three lenses; a fifth element of a negative lens, at the object end thereof, having a concave surface; and a sixth element of a positive lens, at the object end thereof, having a convex surface. The objective lens satisfies the following three conditional equations, assuming that "f" designates the focal distance of the entire lens system:

$$0.44f < R\ II < 0.65f \quad (1)$$

$$0.63f < R\ IV < 1.00f \quad (2)$$

$$0.55f < S\ III + D\ IV < 0.70f \quad (3)$$

where R II is the curvature radius of the object-end surface of the second lens element; R IV, the curvature radius of the object-end surface of the fourth lens element; S III, a distance between the third and the fourth lens elements; and D IV, the thickness of the fourth lens element.

6 Claims, 8 Drawing Sheets

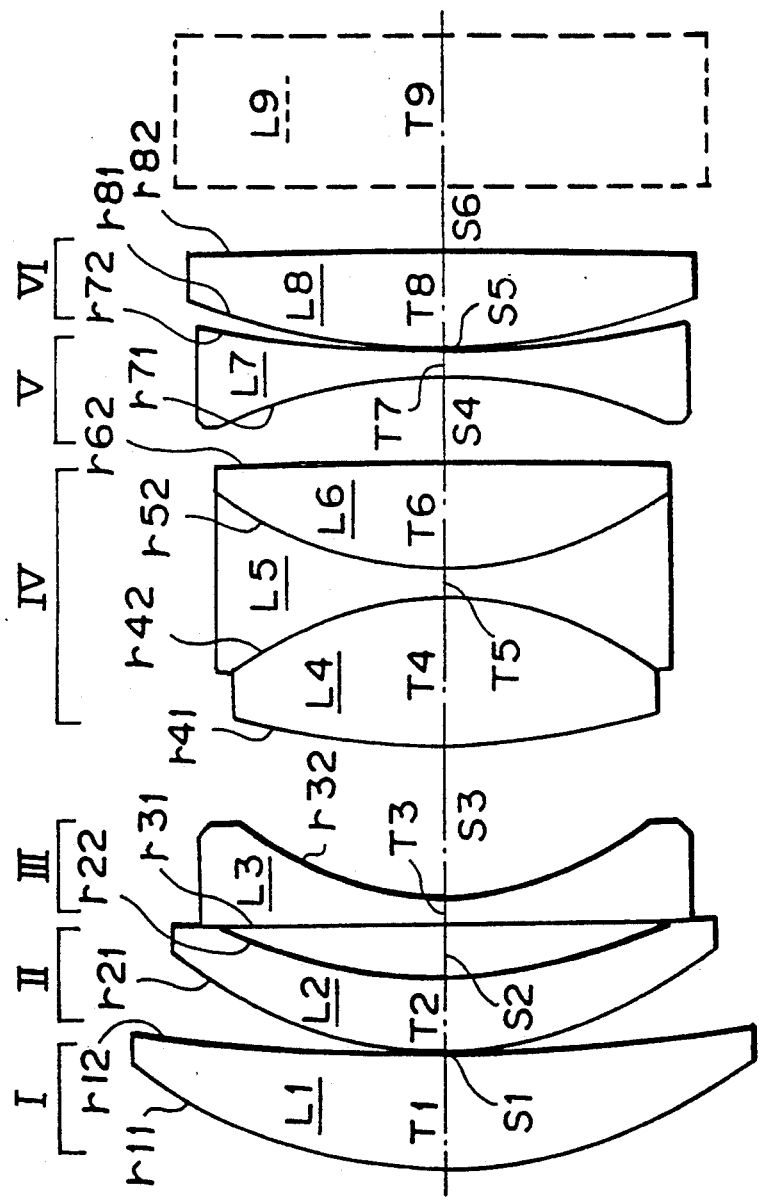
F I G. 5

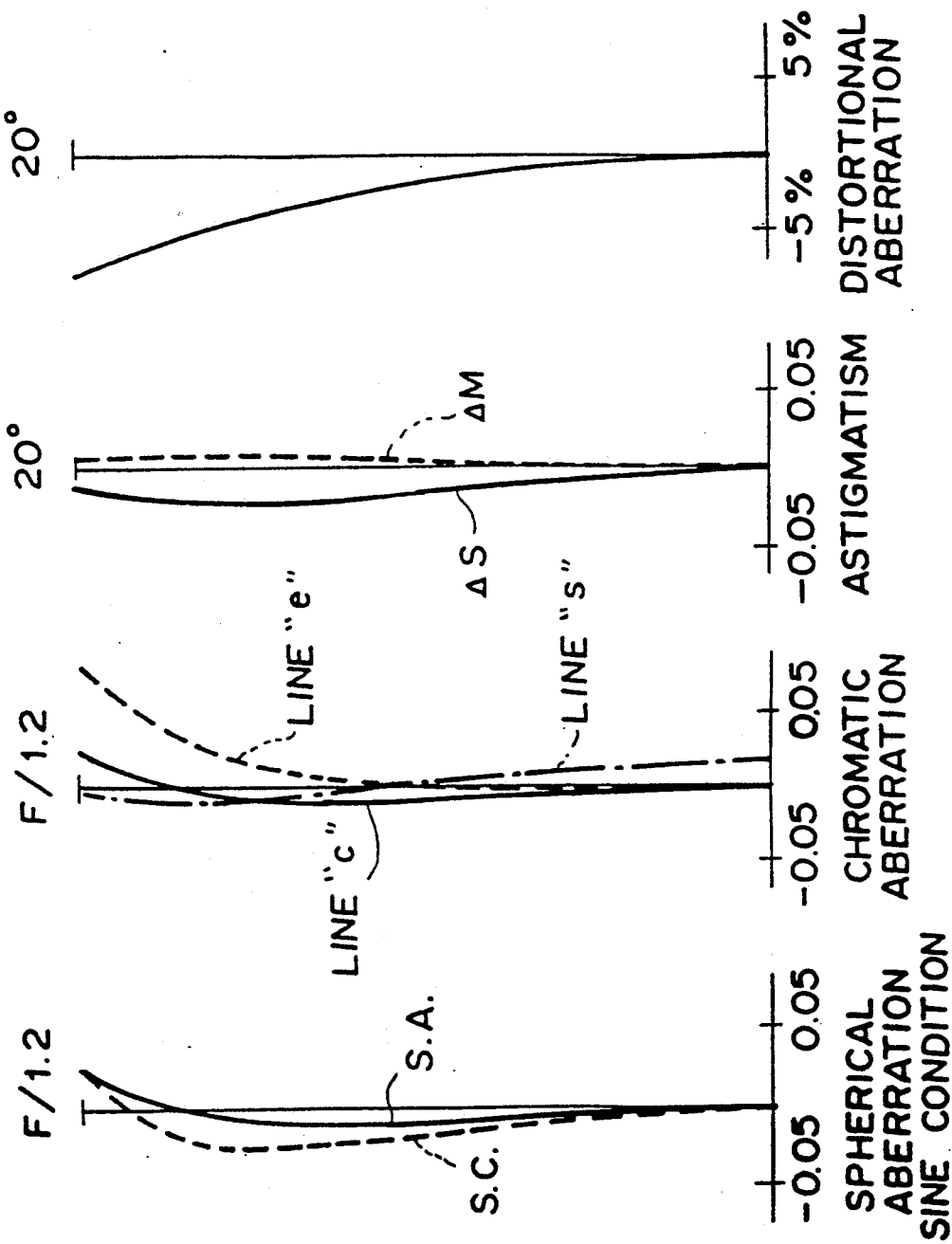

OBJECTIVE WITH LARGE APERTURE RATIO

BACKGROUND OF THE INVENTION

1. Field of the Invention

This invention relates to an objective lens with a large aperture ratio, and more particularly to an objective lens, with a large aperture ratio, for use in a compact noctovision, or a night viewing device.

2. Description of the Prior Art

An objective lens has hitherto been used in a noctovision which produces an image intensified by several thousands to tens of thousands of times as bright as the original object image acquired under the light of stars, that is, 0.01 to 0.02 lux by collecting weak light with an objective lens and amplifying the image with an image intensifier (a photoelectric amplifier tube). Examples of such an objective lens includes U.S. Pat. No. 4,076,390 wherein an objective has a visual angle of about 40°.

The objective lens, used in such a noctovision, is required to have a small F-number, and produce a bright image. In the case of this lens, it is also necessary to appropriately correct the chromatic aberration of an image over a wide range of wavelengths, because the sensitivity characteristics of an Image Intensifier Tube extends over the range from a visible ray to a near infrared ray. Moreover, there is a demand for an objective lens which possesses a negative distortional aberration for correcting a positive distortional aberration of an eyepiece. However, the aforementioned existing objective lens cannot meet such a demand because of its large F-number and capacity which is inadequate to produce a large negative distortional aberration.

In practice, with respect to the eyepiece used in combination with the noctovision, an objective lens with a positive distortional aberration is, in many occasions, employed as an eyepiece because the correction of a distortional aberration is difficult at the eyepiece side. Therefore, there has been adopted a technique in which a distortional aberration is corrected at large by canceling a positive distortional aberration of the eyepiece by the use of an objective lens possessing a negative distortional aberration of about −4% to −9%. In order to produce such a large negative distortional aberration, the lens should be provided with, at the front end thereof, a surface having a strong negative power, or, at the rear end thereof, a surface having a strong positive power. The structure with such a simple power arrangement renders the lens bulky, liable to a coma aberration and an astigmatism, and difficult to effect the balanced correction of these aberrations.

SUMMARY OF THE INVENTION

In view of the foregoing description and observations, the primary object of this invention is to provide an objective lens, with a large aperture ratio, which has a small F-number, and is designed to maintain a large negative distortional aberration suppressing other aberrations.

Another object of this invention is to provide a compact objective lens, with a large aperture ratio, which is superior in performance.

Still another object of this invention is to provide an objective lens, with a large aperture ratio, which can be used with various types of lenses.

To these ends, according to one preferred mode of this invention, there is provided an objective lens comprising, respectively from the object:

a first element of a positive lens, at the object end thereof, having a convex surface;

a second element of a positive meniscus lens, at the object end thereof, having a convex surface;

a third element of a negative lens, at the image end thereof, having a concave surface;

a fourth element of a single lens or a cemented lens, at the object end thereof, having a convex surface, wherein the cemented lens includes two or three lenses;

a fifth element of a negative lens, at the object end thereof, having a concave surface; and a sixth element of a positive lens, at the object end thereof, having a convex surface; and wherein the objective lens satisfies the following three conditional equations, assuming that "f" designates the focal distance of the entire lens system:

$$0.44f < R\ II < 0.65f \quad (1)$$

$$0.63f < R\ IV < 1.00f \quad (2)$$

$$0.55f < S\ III + D\ IV < 0.70f \quad (3)$$

where

R II: the curvature radius of the object-end surface of the second lens element

R IV: the curvature radius of the object-end surface of the fourth lens element

S III: a distance between the third and the fourth lens elements

D IV: the thickness of the fourth lens element.

More preferably, the objective lens, defined in the first preferred mode, should satisfy the following two more conditional equations:

$$0.50f < -R\ V < 0.80f \quad (4)$$

$$0.20f < D\ IV < 0.50f \quad (5)$$

where

R V: the curvature radius of the object-end surface of the fifth lens element.

In the above arrangement, the fourth lens element, that is, the positive lens having at the object end thereof a convex surface, produces a large negative distortional aberration. In order to eliminate a spherical aberration, a coma aberration and an astigmatism, resulting from the use of the fourth lens, there are disposed the first through third lens elements, each having a relatively high refractive index; namely, respectively from the object, a positive lens, a positive meniscus lens, and a negative lens having, at the image end thereof, a concave surface. Moreover, in this arrangement, the negative lens, at the object end thereof, having a concave surface and the positive lens, at the object end thereof, having a convex surface are disposed as the fifth and the sixth lens elements, whereupon the insufficiently corrected spherical aberration and astigmatism are properly corrected with the distortional aberration least varied. As a result of this, there can be obtained an objective lens with a large aperture ratio which is entirely bright and superior in performance.

Regarding the conditional equation (1), that is, $0.44f < RII < 0.65f$, it is difficult to achieve the balanced correction of the spherical aberration and coma aberration, below the lowermost value of this condition; and the balanced correction of the astigmatism and coma aberration, above the uppermost value of the same.

Likewise, with regard to the conditional equation (2), i.e., $0.63f < R\ IV < 1.00f$, it is difficult to attain the balanced correction of the spherical aberration and coma aberration, below the lowermost value of the condition; and the correction of the astigmatism by the generation of an adequate negative distortional aberration, above the uppermost value of the same.

Pertaining to the third conditional equation (3), i.e., $0.55f < SIII + D\ IV < 0.70f$, it is difficult to effect the balanced correction of the spherical aberration and astigmatism, below the lowermost value of the condition; and the reduction of the lens, in size, at large as well as the generation of an adequate negative distortional aberration, above the uppermost value of the condition. To prevent such problems, $S\ III + D\ IV$ is defined in the above range.

With respect to the fourth conditional equation (4), i.e., $0.50f < -R\ V < 0.80f$, it is difficult to effect the balanced correction of the spherical aberration and coma aberration, below the lowermost value of the condition; and the correction of the spherical aberration by the generation of an adequate negative distortional aberration, above the uppermost value of the condition. Thus, $-R\ V$ should be defined in the above range preferably.

In addition, concerning the fifth conditional equation (5), i.e., $0.20f < D\ IV < 0.50f$, it is difficult to effect the balanced correction of the spherical aberration and astigmatism, below the lowermost value of the condition; and the correction of the coma aberration and astigmatism by the generation of an adequate negative distortional aberration, above the uppermost value of the condition. Hence, $D\ IV$ should preferably be set in the foregoing range.

BRIEF DESCRIPTION OF THE DRAWINGS

FIG. 5 is a cross-sectional view showing an objective lens with a large aperture ratio according to a third embodiment of this invention;

FIG. 8 shows aberration curves of an objective lens with a large aperture ratio according to a fourth embodiment of this invention.

DESCRIPTION OF THE PREFERRED EMBODIMENTS

Figure 1:
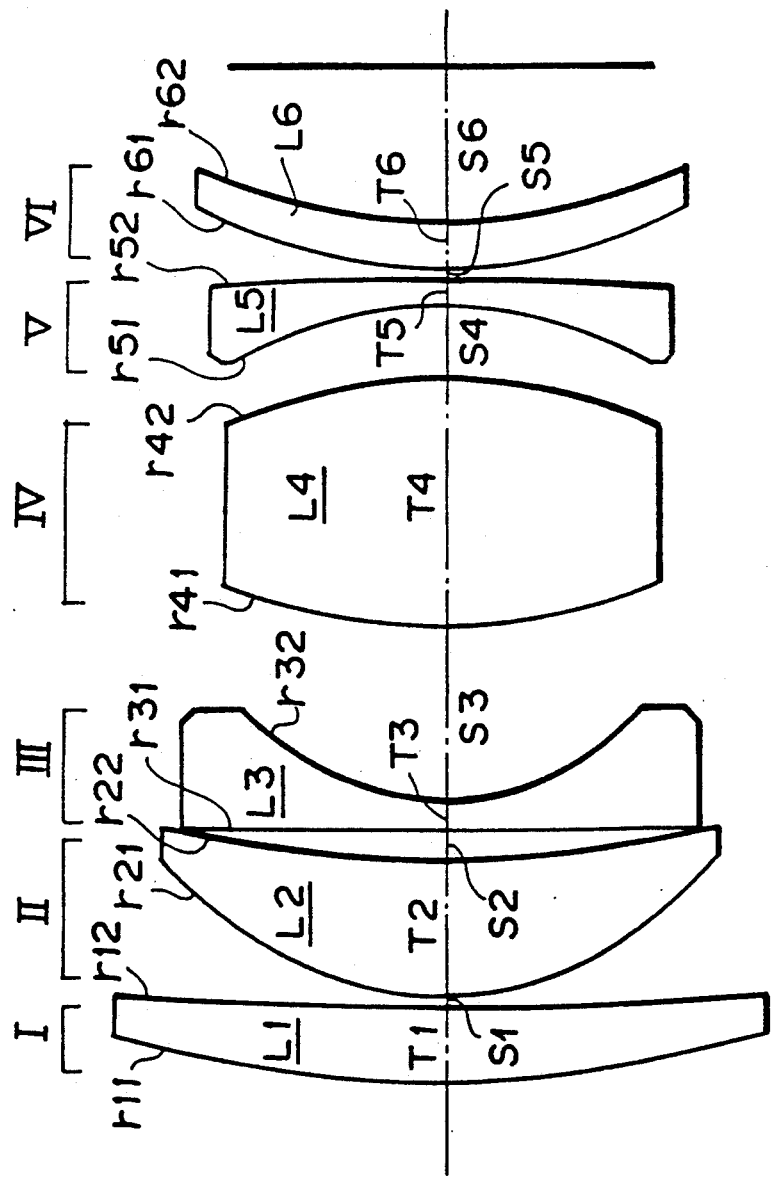
FIG. 1 is a cross-sectional view showing an objective lens with a large aperture ratio according to a first embodiment of this invention.

Referring to the accompanying drawings of this invention, preferred embodiments of this invention will now be described in detail hereinbelow.

Throughout the drawings, the left side of the drawing paper is defined as the object side, while the right side of the same is defined as the image side.

First Embodiment

An objective lens with a large aperture ratio, according to a first embodiment, is comprised of, respectively from the object side;

a first lens element I of a positive lens L1 having, at the object end thereof, a convex surface;

a second lens element II of a positive meniscus lens L2, having at the object end thereof, a convex surface;

a third lens element III of a negative lens L3 having, at the image end thereof, a concave surface;

a fourth lens element IV of a positive single lens L4, having at the object end thereof, a convex surface;

a fifth lens element V of a negative lens L5, at the object end thereof, having a concave surface; and a sixth lens element VI of a positive lens L6, at the object end thereof, having a convex surface.

Listed in the following Table 1 are r11–r62 designating the curvature radius at opposite ends of each lens element, i.e., L1 through L6; T1–T6, the center thickness of each lens element; S1–S6, the surface-to-surface distance between the lens elements; $\nu d1$–$\nu d6$, the refractive index relative to the line "d" of each lens element; and d1–d6, the Abbe number of each lens element. Here, the values of the curvature radius "r", the center thickness "T", and the surface-to-surface distance "S" are the ratio of these values to the focal distance "f" of the total lens system that is defined as 1.00. The aperture ratio of the objective lens, exemplifying this embodiment, is 1:1.2, and the visual field of the lens is $2\omega = 40$.

TABLE 1

| First lens element I: | | | | |
|---|---|---|---|---|
| L1 | r11 = 1.5347 | T1 = 0.1080 | Nd1 = 1.77250 | $\nu$d1 = 49.6 |
| | r12 = 8.2711 | S1 = 0.0115 | | |
| Second lens element II: | | | | |
| L2 | r21 = 0.4888 | T2 = 0.1877 | Nd2 = 1.77250 | $\nu$d2 = 49.6 |
| | r22 = 1.6025 | S2 = 0.0463 | | |
| Third lens element III: | | | | |
| L3 | r31 = 15.5780 | T3 = 0.0385 | Nd3 = 1.76182 | $\nu$d3 = 26.6 |
| | r32 = 0.3641 | S3 = 0.2570 | | |
| Fourth lens element IV: | | | | |
| L4 | r41 = 0.7965 | T4 = 0.3530 | Nd4 = 1.77250 | $\nu$d4 = 49.6 |
| | r42 = −0.7194 | S4 = 0.0999 | | |
| Fifth lens element V: | | | | |
| L5 | r51 = −0.5824 | T5 = 0.0385 | Nd5 = 1.76182 | $\nu$d5 = 26.6 |
| | r52 = −6.8383 | S5 = 0.0115 | | |
| Sixth lens element VI: | | | | |
| L6 | r61 = 0.6852 | T6 = 0.0692 | Nd6 = 1.77250 | $\nu$d6 = 49.6 |

TABLE 1-continued

| | | |
|---|---|---|
| r62 = 0.8020 | S6 = 0.2225 | |

Figure 2:
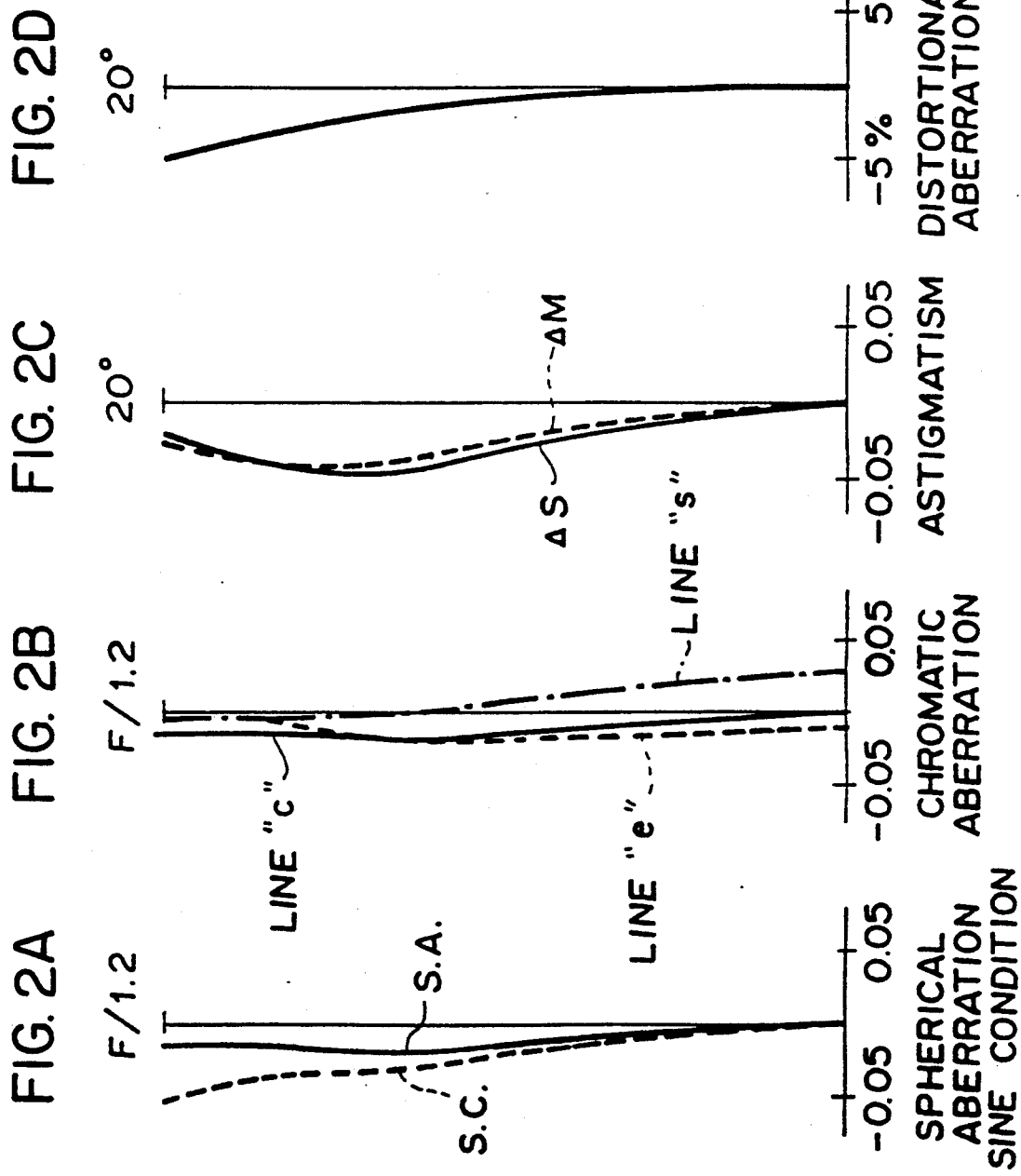
FIG. 2 shows aberration curves of an objective lens with a large aperture ratio according to a first embodiment of this invention.

FIG. 2 shows aberration curves of the objective lens with a large aperture ratio which has the above described arrangement. The following are figures of the F-number, the distortional aberration and other aberrations.

tance "S" are the ratio of these values to the focal distance "f" of the total lens system that is defined as 1.00. The aperture ratio of the objective lens, exemplifying this embodiment, is 1:1.2, and the visual field of the lens is $2\omega = 40°$.

TABLE 2

| First lens element I: | | | | |
|---|---|---|---|---|
| L1 | r11 = 0.9598 | T1 = 0.1107 | Nd1 = 1.77250 | νd1 = 49.6 |
| | r12 = 2.0161 | S1 = 0.0111 | | |
| Second lens element II: | | | | |
| L2 | r21 = 0.5312 | T2 = 0.1752 | Nd2 = 1.77250 | νd2 = 49.6 |
| | r22 = 1.6460 | S2 = 0.0657 | | |
| Third lens element III: | | | | |
| L3 | r31 = 8.8543 | T3 = 0.0370 | Nd3 = 1.76182 | νd3 = 26.6 |
| | r32 = 0.3811 | S3 = 0.2893 | | |
| Fourth lens element IV: | | | | |
| L4 | r41 = 0.6781 | T4 = 0.2672 | Nd4 = 1.77250 | νd4 = 49.6 |
| | r42 = −0.5887 | | | |
| L5 | r51 = r42 | T5 = 0.0667 | Nd5 = 1.76182 | νd5 = 26.6 |
| | r52 = −0.7960 | S4 = 0.0741 | | |
| Fifth lens element V: | | | | |
| L6 | r61 = −0.5571 | T6 = 0.0370 | Nd6 = 1.59270 | νd6 = 35.5 |
| | r62 = 1.1014 | S5 = 0.0111 | | |
| Sixth lens element VI: | | | | |
| L7 | r71 = 0.7155 | T7 = 0.0926 | Nd7 = 1.77250 | νd7 = 49.6 |
| | r72 = 1.7552 | S6 = 0.2180 | | |

F-number: 1.2
Length of lens: 1.221
Back focal length: 0.223
Distortional aberration: −4.8%
R II: 0.489
R IV: 0.797
−R V: 0.582
D IV: 0.353
S III+D IV: 0.610

Second Embodiment

Figure 3:
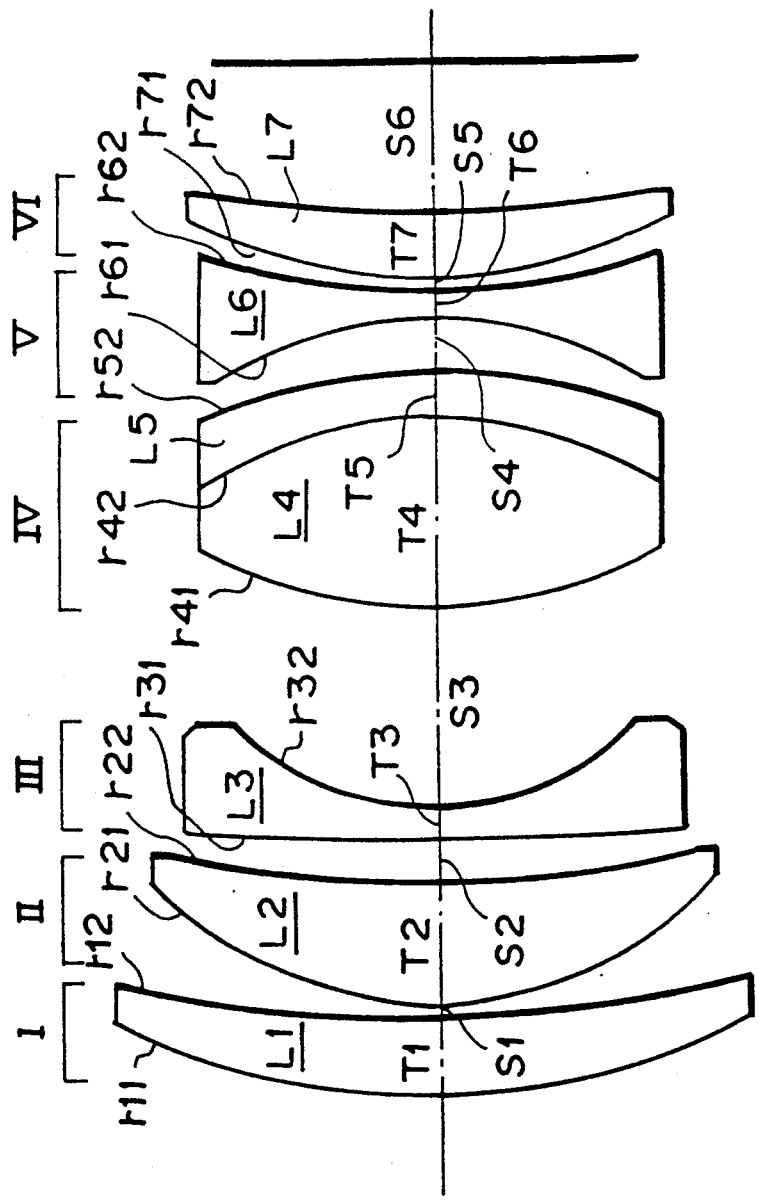
FIG. 3 is a cross-sectional view showing an objective lens with a large aperture ratio according to a second embodiment of this invention.

FIG. 3 is a cross-sectional view of a lens system exemplifying a second embodiment.

An objective lens with a large aperture ratio, according to this embodiment, is constituted of, respectively from the object side;

a first lens element I of a positive lens L1 having, at the object end thereof, a convex surface;

a second lens element II of a positive meniscus lens L2, having at the object end thereof, a convex surface;

a third lens element III of a negative lens L3 having, at the image end thereof, a concave surface;

a fourth lens element IV of a cemented lens, having at the object end thereof, a convex surface wherein the cemented lens possesses a positive refracting power, at large, and is made of the combination of a positive lens L4 and a negative lens L5;

a fifth lens element V of a negative lens L6, at the object end thereof, having a concave surface; and a sixth lens element VI of a positive lens L7, at the object end thereof, having a convex surface.

Figure 4:
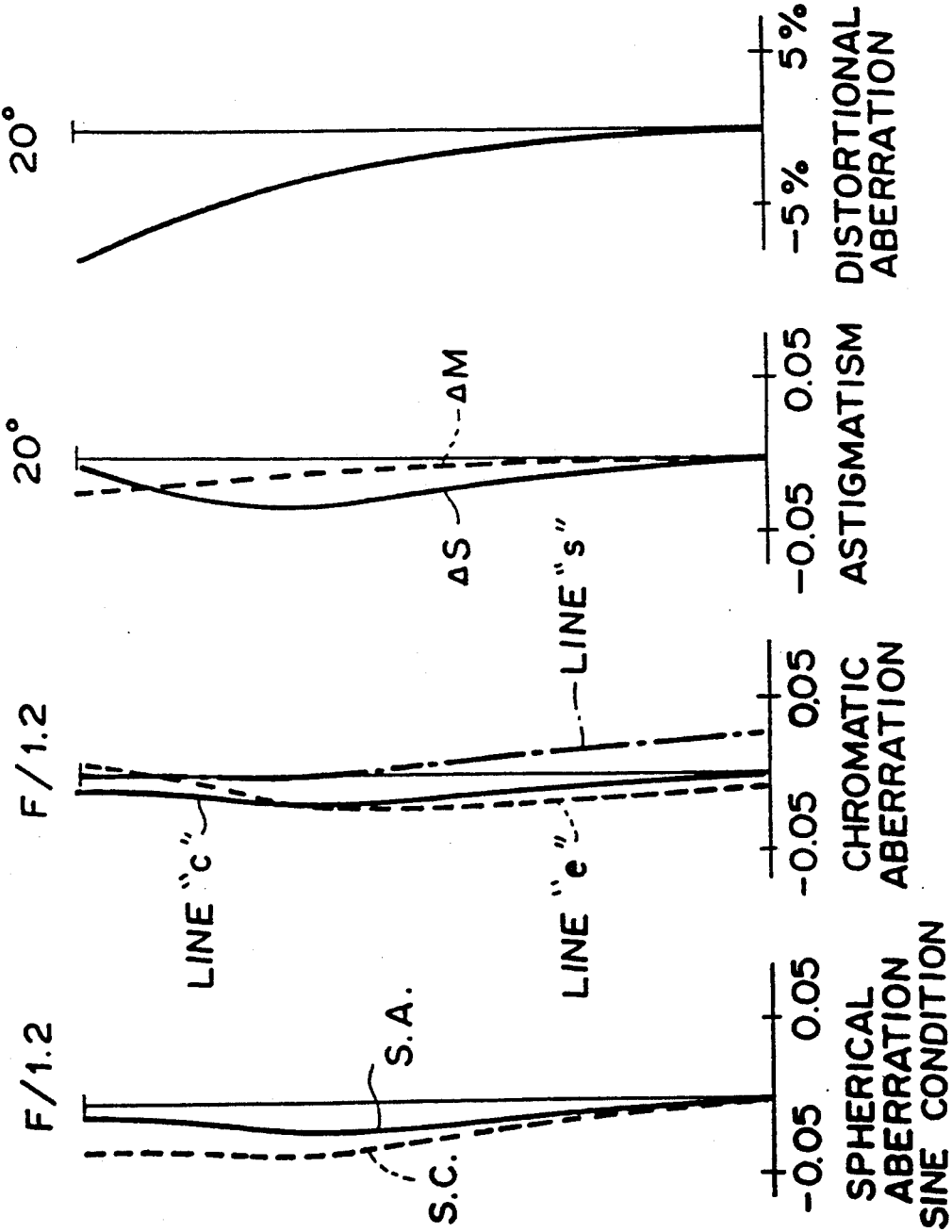
FIG. 4 shows aberration curves of an objective lens with a large aperture ratio according to a second embodiment of this invention.

Enlisted in the following Table 2 are r11–r72 designating the curvature radius at opposite ends of each lens element, i.e., L1 through L7; T1–T7, the center thickness of each lens element; S1–S6, the surface-to-surface distance between the lens elements; Nd1–Nd7, the refractive index relative to the line "d" of each lens element; and νd1–νd7, the Abbe number of each lens element. Here, the values of the curvature radius "r", the center thickness "T", and the surface-to-surface dis- FIG. 4 shows aberration curves of the objective lens with a large aperture ratio which has the above described arrangement. The following are figures of the F-number, the distortional aberration and other aberrations.

F-number: 1.2
Length of lens: 1.238
Back focal length: 0.218
Distortional aberration: −8.3%
R II: 0.531
R IV: 0.678
−R V: 0.557
D IV: 0.334
S III+D IV: 0.623

Third Embodiment

FIG. 5 is a cross-sectional view of a lens system exemplifying a second embodiment.

An objective lens with a large aperture ratio, according to this embodiment, is constituted of, respectively from the object side;

a first lens element I of a positive lens L1 having, at the object end thereof, a convex surface;

a second lens element II of a positive meniscus lens L2, having at the object end thereof, a convex surface;

a third lens element III of a negative lens L3 having, at the image end thereof, a concave surface;

a fourth lens element IV of a cemented lens, having at the object end thereof, a convex surface, wherein the cemented lens possesses a positive refracting power, at large, and is made of the combination of, respectively from the object end, a positive lens L4, a negative lens L5, and a positive lens L6;

a fifth lens element V of a negative lens L7, at the object end thereof, having a concave surface;

a sixth lens element VI of a positive lens L8, at the object end thereof, having a convex surface; and a cover glass L9.

Enlisted in the following Table 3 are r11-r82 designating the curvature radius at opposite ends of each lens element, i.e., L1 through L8; T1-T9, the center thickness of each lens element; S1-S6, the surface-to-surface distance between the lens elements; Nd1-Nd9, the refractive index relative to the line "d" of each lens element; and νd1-νd9, the Abbe number of each lens element. Here, the values of the curvature radius "r", the center thickness "T", and the surface-to-surface distance "S" are the ratio of these values to the focal distance "f" of the total lens system that is defined as 1.00. The aperture ratio of the objective lens, exemplifying this embodiment, is 1:1.2, and the visual field of the lens is $2\omega=40°$.

An objective lens with a large aperture ratio, according to this embodiment, is constituted of, respectively from the object side;

a first lens element I of a positive lens L1 having, at the object end thereof, a convex surface;

a second lens element II of a positive meniscus lens L2, having at the object end thereof, a convex surface;

a third lens element III of a negative lens L3 having, at the image end thereof, a concave surface;

a fourth lens element IV of a cemented lens, having at the object end thereof, a convex surface, wherein the cemented lens possesses a positive refracting power, at large, and is made of the combination of, respectively from the object end, a positive lens L4, a negative lens

TABLE 3

| First lens element I: | | | | |
|---|---|---|---|---|
| L1 | r11 = 0.6963 | T1 = 0.1604 | Nd1 = 1.80420 | νd1 = 46.5 |
| | r12 = 3.0941 | S1 = 0.0037 | | |
| Second lens element II: | | | | |
| L2 | r21 = 0.5853 | T2 = 0.1000 | Nd2 = 1.77250 | νd2 = 49.6 |
| | r22 = 0.7028 | S2 = 0.0796 | | |
| Third lens element III: | | | | |
| L3 | r31 = 280.3800 | T3 = 0.0370 | Nd3 = 1.78472 | νd3 = 25.7 |
| | r32 = 0.4353 | S3 = 0.2193 | | |
| Fourth lens element IV: | | | | |
| L4 | r41 = 0.9227 | T4 = 0.2148 | Nd4 = 1.83500 | νd4 = 43.0 |
| | r42 = −0.4859 | | | |
| L5 | r51 = r42 | T5 = 0.0370 | Nd5 = 1.67270 | νd5 = 32.2 |
| | r52 = 0.5012 | | | |
| L6 | r61 = r52 | T6 = 0.1519 | Nd6 = 1.83500 | νd6 = 43.0 |
| | r62 = −8.5977 | S4 = 0.1222 | | |
| Fifth lens element V: | | | | |
| L7 | r71 = −0.7260 | T7 = 0.0370 | Nd7 = 1.51742 | νd7 = 52.2 |
| | r72 = 1.4815 | S5 = 0.0037 | | |
| Sixth lens element VI: | | | | |
| L8 | r81 = 0.8971 | T8 = 0.1407 | Nd8 = 1.80420 | νd8 = 46.5 |
| | r82 = −14.5720 | S6 = 0.0862 | | |
| Cover glass: | | | | |
| L9 | double-plane | T9 = 0.2052 | Nd9 = 1.49831 | νd9 = 65.1 |

Figure 6:
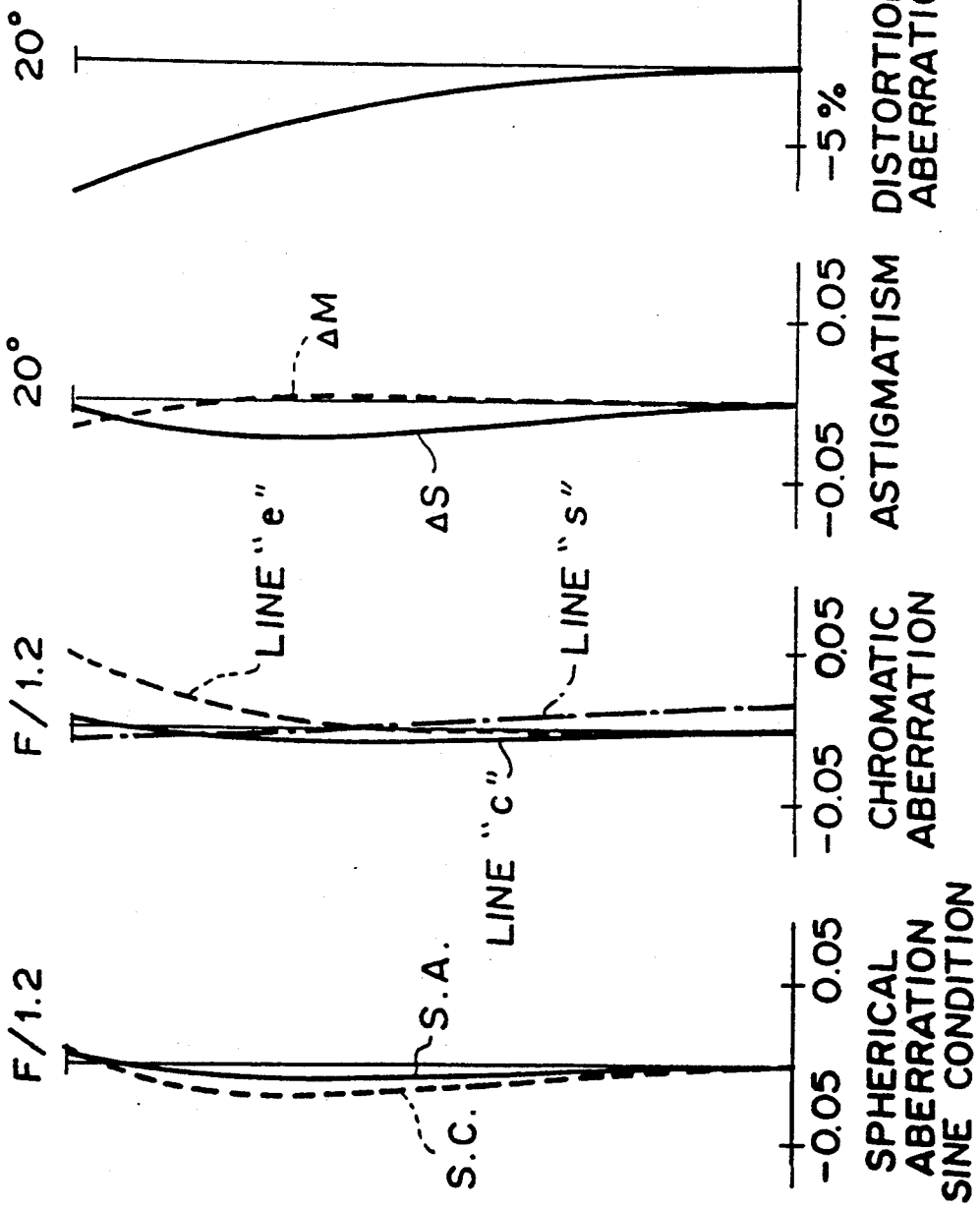
FIG. 6 shows aberration curves of an objective lens with a large aperture ratio according to a third embodiment of this invention.

FIG. 6 shows aberration curves of the objective lens with a large aperture ratio which has the above described arrangement. The following are figures of the F-number, the distortional aberration and other aberrations.

F-number: 1.2
Length of lens: 1.307
Back focal length: 0.223
Distortional aberration: −8.1%
R II: 0.585
R IV: 0.923
−R V: 0.726
D IV: 0.404
S III+D IV: 0.623

Fourth Embodiment

Figure 7:
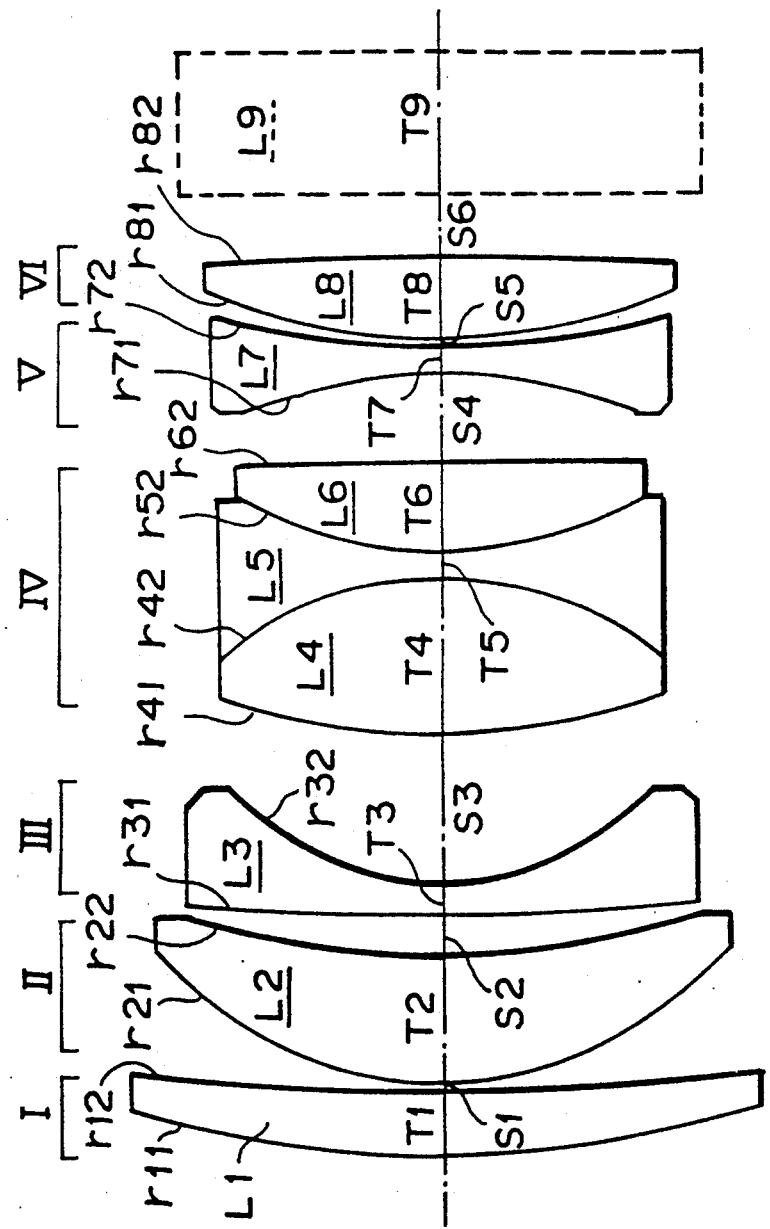
FIG. 7 is a cross-sectional view showing an objective lens with a large aperture ratio according to a fourth embodiment of this invention.

FIG. 7 is a cross-sectional view of a lens system exemplifying a second embodiment.

L5 and a positive lens L6;

a fifth lens element V of a negative lens L7, at the object end thereof, having a concave surface;

a sixth lens element VI of a positive lens L8, at the object end thereof, having a convex surface; and a cover glass L9.

Enlisted in the following Table 4 are r11-r82 designating the curvature radius at opposite ends of each lens element, i.e., L1 through L8; T1-T9, the center thickness of each lens element; S1-S6, the surface-to-surface distance between the lens elements; Nd1-Nd9, the refractive index relative to the line "d" of each lens element; and νd1-νd9, the Abbe number of each lens element. Here, the values of the curvature radius "r", the center thickness "T", and the sur-face-to-surface distance "S" are the ratio of these values to the focal distance "f" of the total lens system that is defined as 1.00. The aperture ratio of the objective lens, exemplifying this embodiment, is 1:1.2, and the visual field of the lens is $2\omega=40°$.

TABLE 4

| First lens element I: | | | | |
|---|---|---|---|---|
| L1 | r11 = 1.4131 | T1 = 0.0911 | Nd1 = 1.77250 | νd1 = 49.6 |
| | r12 = 3.6497 | S1 = 0.0093 | | |
| Second lens element II: | | | | |
| L2 | r21 = 0.5246 | T2 = 0.1782 | Nd2 = 1.83500 | νd2 = 43.0 |
| | r22 = 1.1297 | S2 = 0.0641 | | |
| Third lens element III: | | | | |
| L3 | r31 = 4.6111 | T3 = 0.0407 | Nd3 = 1.80581 | νd3 = 25.5 |
| | r32 = 0.4032 | S3 = 0.2200 | | |
| Fourth lens element IV: | | | | |
| L4 | r41 = 0.8596 | T4 = 0.2267 | Nd4 = 1.80420 | νd4 = 46.5 |
| | r42 = −0.4893 | | | |

TABLE 4-continued

| | | | | |
|---|---|---|---|---|
| L5 | r51 = r42<br>r52 = 0.5674 | T5 = 0.0370 | Nd5 = 1.59270 | νd5 = 35.5 |
| L6 | r61 = r52<br>r62 = plane | T6 = 0.1256<br>S4 = 0.1307 | Nd6 = 1.77250 | νd6 = 49.6 |
| Fifth lens element V:<br>L7 | r71 = −0.6857<br>r72 = 1.1487 | T7 = 0.0370<br>S5 = 0.0093 | Nd7 = 1.58144 | νd7 = 40.9 |
| Sixth lens element VI:<br>L8 | r81 = 0.8144<br>r82 = −5.2156 | T8 = 0.1241<br>S6 = 0.0871 | Nd8 = 1.77250 | νd8 = 49.6 |
| Cover glass:<br>L9 | double-plane | T9 = 0.2051 | Nd9 = 1.49831 | νd9 = 65.1 |

FIG. 8 shows aberration curves of the objective lens with a large aperture ratio which has the above described arrangement. The following are figures of the F-number, the distortional aberration and other aberrations.

F-number: 1.2
Length of lens: 1.294
Back focal length: 0.224
Distortional aberration: −8.0%
R II: 0.525
R IV: 0.860
−R V: 0.686
D IV: 0.389
S III+D IV: 0.609

There is obtained a negative distortional aberration as large as −4.8% to −8.3%, as shown in the aberration curves of each embodiment, as well as the balanced correction of the remaining aberrations; namely, the spherical aberration, the chromatic aberration, and the astigmatism when the following conditions are respectively satisfied.

The curvature radius R II of the object-end surface of the second lens element II is set within the range of $$0.44f < R\ II < 0.65f \quad (1)$$

the curvature radius R IV of the object-end surface of the fourth lens element IV is set within the range of $$0.63f < R\ IV < 1.00f \quad (2)$$

the sum of the distance S III, between the third lens element III and the fourth lens element IV, and the thickness D IV of the fourth lens element is in the range of $$0.55f < S\ III + D\ IV < 0.70f \quad (3)$$

the curvature radius R V of the object-end surface of the fifth lens element V is set in the range of $$0.50f < -R\ V < 0.80f \quad (4);\ \text{and}$$

the thickness D IV of the fourth lens element IV is set in the range of $$0.20f < D\ IV < 0.50f \quad (5)$$

Particularly, the use of the positive lens having, at the object end thereof, a convex surface as the fourth lens element IV causes a large negative distortion aberration to be produced, and the spherical aberration, the coma aberration and the astigmatism, resulting from the use of such a lens, are corrected by the series of lenses from the first element I to the third lens element III; namely, respectively from the object, the positive lens, the positive meniscus lens, and the negative lens which has at the object end thereof a concave surface, wherein the positive lenses possess a relatively strong refracting power. In addition, the use of the negative lens, having at the object end thereof a concave surface, and the positive lens, having at the object end thereof a convex surface, as the fifth and the sixth lens elements, results in the appropriate correction of the insufficiently corrected spherical aberration and astigmatism without a substantial variation of the distortional aberration.

The positive lenses used as the first and the second lens elements are made up of a high refractive and low dispersion glass; the negative lens used as the third lens element III is composed of a high refractive and dispersion glass; the negative lens of the fifth lens element V is constituted of a high dispersion glass; and the positive lens used as the sixth lens element VI is a high refractive and low dispersion glass. Such an arrangement also effects the correction of the chromatic aberration.

With regard to the second and fourth embodiments, the generation of such a large negative distortional aberration as set forth above involves the increase of the astigmatism at the fourth lens element IV which, in turn, results in an unbalanced chromatic aberration. This drawback is overcome by the use of a low refractive and high dispersion glass as the negative lens of the fifth lens element V together with the use of the cemented lens, being composed of two or three lenses, as the fourth lens element.

The objective lens with a large aperture ratio, according to this invention, is particularly useful when it is used in the noctovision, but, needless to say, this lens is not limited to such an application, but may be used with other types of lenses.

It will be understood that the above description of the present invention is susceptible to various modifications, changes, and adaptations and that the same are intended to be comprehended within the meaning and range of equivalents of the appended claims.

What is claimed is:

1. An objective lens comprising, respectively from the object:
   a first element of a positive lens, at the object end thereof, having a convex surface;
   a second element of a positive meniscus lens, at the object end thereof, having a convex surface;
   a third element of a negative lens, at the image end thereof, having a concave surface;
   a fourth element of a single lens or a cemented lens, at the object end thereof, having a convex surface, wherein the cemented lens includes two or three lenses;
   a fifth element of a negative lens, at the object end thereof, having a concave surface; and a sixth element of a positive lens, at the object end thereof, having a convex surface; and wherein the objective lens satisfies the following three conditional equations, assuming that "f" designates the focal distance of the entire lens system:

$$0.44f < R\ II < 0.65f \quad (1)$$

$$0.63f < R\ IV < 1.00f \quad (2)$$

$$0.55f < S\ III + D\ IV < 0.70f \quad (3)$$

where
R II: the curvature radius of the object-end surface of the second lens element
R IV: the curvature radius of the object-end surface of the fourth lens element
S III: a distance between the third and the fourth lens elements
D IV: the thickness of the fourth lens element.

2. An objective lens with a large aperture ratio as defined in claim 1, wherein the objective lens further satisfies the following conditional equations:

$$0.50f < -R\ V < 0.80f \quad (4)$$

$$0.20f < D\ IV < 0.50f \quad (5)$$

where
R V: the curvature radius of the object-end surface of the fifth lens element.

3. An objective lens with a large aperture ratio as defined in claim 2, wherein the lens elements are respectively specified as:

| First lens element I: | | | | |
|---|---|---|---|---|
| L1 | r11 = 1.5347 | T1 = 0.1080 | Nd1 = 1.77250 | νd1 = 49.6 |
| | r12 = 8.2711 | S1 = 0.0115 | | |
| Second lens element II: | | | | |
| L2 | r21 = 0.4888 | T2 = 0.1877 | Nd2 = 1.77250 | νd2 = 49.6 |
| | r22 = 1.6025 | S2 = 0.0463 | | |
| Third lens element III: | | | | |
| L3 | r31 = 15.5780 | T3 = 0.0385 | Nd3 = 1.76182 | νd3 = 26.6 |
| | r32 = 0.3641 | S3 = 0.2570 | | |
| Fourth lens element IV: | | | | |
| L4 | r41 = 0.7965 | T4 = 0.3530 | Nd4 = 1.77250 | νd4 = 49.6 |
| | r42 = −0.7194 | S4 = 0.0999 | | |
| Fifth lens element V: | | | | |
| L5 | r51 = −0.5824 | T5 = 0.0385 | Nd5 = 1.76182 | νd5 = 26.6 |
| | r52 = −6.8383 | S5 = 0.0115 | | |
| Sixth lens element VI: | | | | |
| L6 | r61 = 0.6852 | T6 = 0.0692 | Nd6 = 1.77250 | νd6 = 49.6 |
| | r62 = 0.8020 | S6 = 0.2225 | | |

4. An objective lens with a large aperture ratio as defined in claim 2, wherein the lens elements are respectively specified as:

| First lens element I: | | | | |
|---|---|---|---|---|
| L1 | r11 = 0.9598 | T1 = 0.1107 | Nd1 = 1.77250 | νd1 = 49.6 |
| | r12 = 2.0161 | S1 = 0.0111 | | |
| Second lens element II: | | | | |
| L2 | r21 = 0.5312 | T2 = 0.1752 | Nd2 = 1.77250 | νd2 = 49.6 |
| | r22 = 1.6460 | S2 = 0.0657 | | |
| Third lens element III: | | | | |
| L3 | r31 = 8.8543 | T3 = 0.0370 | Nd3 = 1.76182 | νd3 = 26.6 |
| | r32 = 0.3811 | S3 = 0.2893 | | |
| Fourth lens element IV: | | | | |
| L4 | r41 = 0.6781 | T4 = 0.2672 | Nd4 = 1.77250 | νd4 = 49.6 |
| | r42 = −0.5887 | | | |
| L5 | r51 = r42 | T5 = 0.0667 | Nd5 = 1.76182 | νd5 = 26.6 |
| | r52 = −0.7960 | S4 = 0.0741 | | |
| Fifth lens element V: | | | | |
| L6 | r61 = −0.5571 | T6 = 0.0370 | Nd6 = 1.59270 | νd6 = 35.5 |
| | r62 = 1.1014 | S5 = 0.0111 | | |
| Sixth lens element VI: | | | | |
| L7 | r71 = 0.7155 | T7 = 0.0926 | Nd7 = 1.77250 | νd7 = 49.6 |
| | r72 = 1.7552 | S6 = 0.2180 | | |

5. An objective lens with a large aperture ratio as defined in claim 2, further comprising a cover glass, and wherein the lens elements and the cover glass are respectively specified as:

| First lens element I: | | | | |
|---|---|---|---|---|
| L1 | r11 = 0.6963 | T1 = 0.1604 | Nd1 = 1.80420 | νd1 = 46.5 |
| | r12 = 3.0941 | S1 = 0.0037 | | |
| Second lens element II: | | | | |
| L2 | r21 = 0.5853 | T2 = 0.1000 | Nd2 = 1.77250 | νd2 = 49.6 |
| | r22 = 0.7028 | S2 = 0.0796 | | |
| Third lens element III: | | | | |
| L3 | r31 = 280.3800 | T3 = 0.0370 | Nd3 = 1.78472 | νd3 = 25.7 |
| | r32 = 0.4353 | S3 = 0.2193 | | |
| Fourth lens element IV: | | | | |
| L4 | r41 = 0.9227 | T4 = 0.2148 | Nd4 = 1.83500 | νd4 = 43.0 |

-continued

|  | | | | |
|---|---|---|---|---|
| | r42 = −0.4859 | | | |
| L5 | r51 = r42 | T5 = 0.0370 | Nd5 = 1.67270 | νd5 = 32.2 |
| | r52 = 0.5012 | | | |
| L6 | r61 = r52 | T6 = 0.1519 | Nd6 = 1.83500 | νd6 = 43.0 |
| | r62 = −8.5977 | S4 = 0.1222 | | |
| Fifth lens element V: | | | | |
| L7 | r71 = −0.7260 | T7 = 0.0370 | Nd7 = 1.51742 | νd7 = 52.2 |
| | r72 = 1.4815 | S5 = 0.0037 | | |
| Sixth lens element VI: | | | | |
| L8 | r81 = 0.8971 | T8 = 0.1407 | Nd8 = 1.80420 | νd8 = 46.5 |
| | r82 = −14.5720 | S6 = 0.0862 | | |
| Cover glass: | | | | |
| L9 | double-plane | T9 = 0.2052 | Nd9 = 1.49831 | νd9 = 65.1 |

6. An objective lens with a large aperture ratio as defined in claim 2, further comprising a cover glass at the image side of said sixth element, and wherein the lens elements and the cover glass are respectively specified as:

| | | | | |
|---|---|---|---|---|
| First lens element I: | | | | |
| L1 | r11 = 1.4131 | T1 = 0.0911 | Nd1 = 1.77250 | νd1 = 49.6 |
| | r12 = 3.6497 | S1 = 0.0093 | | |
| Second lens element II: | | | | |
| L2 | r21 = 0.5246 | T2 = 0.1782 | Nd2 = 1.83500 | νd2 = 43.0 |
| | r22 = 1.1297 | S2 = 0.0641 | | |
| Third lens element III: | | | | |
| L3 | r31 = 4.6111 | T3 = 0.0407 | Nd3 = 1.80581 | νd3 = 25.5 |
| | r32 = 0.4032 | S3 = 0.2200 | | |
| Fourth lens element IV: | | | | |
| L4 | r41 = 0.8596 | T4 = 0.2267 | Nd4 = 1.80420 | νd4 = 46.5 |
| | r42 = −0.4893 | | | |
| L5 | r51 = r42 | T5 = 0.0370 | Nd5 = 1.59270 | νd5 = 35.5 |
| | r52 = 0.5674 | | | |
| L6 | r61 = r52 | T6 = 0.1256 | Nd6 = 1.77250 | νd6 = 49.6 |
| | r62 = plane | S4 = 0.1307 | | |
| Fifth lens element V: | | | | |
| L7 | r71 = −0.6857 | T7 = 0.0370 | Nd7 = 1.58144 | νd7 = 40.9 |
| | r72 = 1.1487 | S5 = 0.0093 | | |
| Sixth lens element VI: | | | | |
| L8 | r81 = 0.8144 | T8 = 0.1241 | Nd8 = 1.77250 | νd8 = 49.6 |
| | r82 = −5.2156 | S6 = 0.0871 | | |
| Cover glass: | | | | |
| L9 | double-plane | T9 = 0.2051 | Nd9 = 1.49831 | νd9 = 65.1 |

* * * * *